United States Patent Office 3,119,851
Patented Jan. 28, 1964

---

3,119,851
PROCESS FOR PREPARING VANADIUM TRIS(ACETYLACETONATE)
Edward K. Gladding, New Castle, and Klaus A. Saegebarth, Brandywine Hundred, Del., assignors to E. I. du Pont de Nemours and Company, Wilmington, Del., a corporation of Delaware
No Drawing. Filed July 14, 1961, Ser. No. 124,006
5 Claims. (Cl. 260—429)

This invention relates to a new process for making an organic vanadium compound. More particularly this invention relates to a process for the preparation of vanadium tris(acetylacetonate).

Due to recent knowledge gained in the field of elastomeric ethylene copolymers, vanadium tris(acetylacetonate) has proven to be one of the better, if not the best, coordination catalyst for the preparation of such copolymers. This knowledge has promoted much interest in new methods of preparation of the catalyst itself. Previous catalyst production methods have either produced a high cost catalyst or an inferior catalyst due to contamination.

It is an object of this invention to provide a new process for the preparation of vanadium tris(acetylacetonate). A further object is to provide a more economical process for the preparation of vanadium tris(acetylacetonate). Other objects will appear hereinafter.

These and other objects are accomplished by a process which comprises contacting an aqueous mineral acid solution of a vanadyl salt of an aqueous mineral acid with zinc metal to form a salt of trivalent vanadium, the molar ratio of vanadyl salt:zinc being about 2:1, there being at least about 2 equivalents of acid for each mole of vanadyl salt; forming vanadium tris(acetylacetonate) therein by introducing acetylacetone, the molar ratio of acetylacetone to vanadium being at least 3:1, adding enough inorganic base to raise the pH of the solution to 0.8 to 2.0 thereby precipitating the vanadium tris-(acetylacetonate) which can be separated by mechanical means from the solution.

The reduction of vanadyl salt is carried out by contacting an aqueous mineral acid solution of vanadyl salt with zinc metal. The reactions occur according to the following equations:

½Zn+H⁺→½Zn²⁺+[H]
(VO)²⁺+[H]+H⁺→V³⁺+H₂O
―――――――――――――――――
½Zn+(VO)²⁺+2H⁺→½Zn²⁺+V³⁺+H₂O

In order to make vanadium tris(acetylacetonate) in accordance with the present invention it is necessary to stop the reduction of the vanadyl salt by the zinc at the point where the vanadium has a valence state of 3.

The molar ratio of vanadyl salt:zinc should be about 2:1. When the ratio has a value higher than 2:1, incomplete reduction occurs; the final state is then higher than 3 on the average. When the molar ratio has a value lower than 2:1, the reduction is carried beyond the three state and some vanadium is formed having a valence of 2.

A preferred aqueous mineral acid solution is a dilute sulfuric acid solution. The complete equations for the preferred procedure are:

Zn+H₂SO₄→2[H]+ZnSO₄
2VOSO₄+2[H]+H₂SO₄→V₂(SO₄)₃+2H₂O

Mineral acids other than sulfuric acid may be used such as hydrochloric acid, hydrobromic acid, perchloric acid, and nitric acid. Although the strength of this solution is not critical to the operation of the present invention, there must be at least 2 equivalents of acid present for each mole of vanadyl salt in order to reduce the vanadium properly and to consume all the zinc. A slightly larger proportion of acid is often used, but it is not necessary.

It is most convenient to operate the present invention in a single stage or in situ without isolating the intermediate products; since the final step involves the addition of base to neutralize some of the acid present to raise the pH to a value of at least 0.8, it is wasteful and inconvenient to use a large excess of acid which requires unduly large amounts of base and creates additional inorganic salts which are not desired.

Since much heat is evolved during the reduction, it is convenient to begin the addition of the zinc metal at about 25° C.; external cooling is not necessary although it is sometimes used in order to keep the temperature of the reaction mixture below a temperature of about 70° C. to minimize boiling off water.

During the reduction of vanadyl salt, the solution color changes to the green shade characteristic of the vanadic ion. In order to complete the reaction, it is satisfactory to stir the solution for about 1 to 2 hours at about 50 to 60° C. At this point all the acetylacetone may be added at once to the vanadic salt solution. A deep brown solution of the vanadium tris(acetylacetonate) results immediately. The reaction may be represented as follows where the vanadic salt is vanadic sulfate:

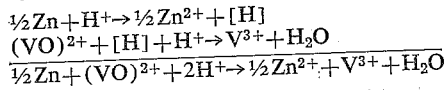

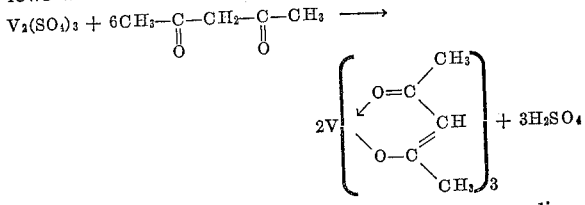

In order to convert all the vanadic salt to vanadium tris(acetylacetonate) it is necessary to at least add 3 moles of acetylacetone for every atom of vanadium present in the solution; excess acetylacetone may be added, if desired.

Finally, vanadium tris(acetylacetonate) is precipitated by adding enough inorganic base to raise the pH of the solution to a value of at least 0.8. It is generally not necessary for the pH to rise above 2.0. Undesired by-products precipitate when the pH is raised to 7. The brown crystalline vanadium tris(acetylacetonate) is collected by conventional filtration, washed with water, and dried to constant weight. Although the nature of the base is not critical, it is preferred to use sodium carbonate or sodium hydroxide.

Precipitation of the chelate begins at a pH of 0.8 and is virtually complete at a pH of 2. Increasing the pH above 2 results in the precipitation of undesirable zinc salts. The fact that vanadium tris(acetylacetonate) can be precipitated essentially quantitatively in the presence of +2 zinc is a surprising and essential feature of the subject process.

The yield of vanadium tris(acetylacetonate) obtained from the precipitation step will decrease at high dilution because the chelate is soluble in water to the extent of 1 part/100 by weight. If very concentrated solutions are employed, ZnSO₄ will coprecipitate with vanadium tris(acetylacetonate); however, it can be washed from the chelate with water. There would have to be more than 96.5 parts of ZnSO₄·7H₂O per 100 parts of water by weight for this coprecipitation to occur.

The vanadyl sulfate used in the preferred process of the present invention is made according to the procedure of Jones given in "Inorganic Syntheses," vol. 5, page 113. The reaction is shown by the following equation:

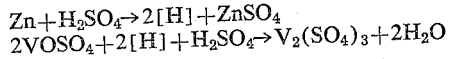
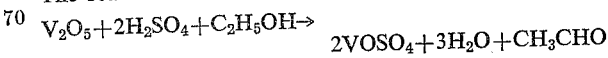

In practice, the sulfuric acid is employed as a dilute (about 33%) aqueous solution. Methanol can be substituted for ethanol to get equivalent results. Molar excesses of both sulfuric acid and ethyl alcohol are normally employed; for example about 15 moles of the alcohol and about 6 moles of the sulfuric acid are employed for every mole of the vanadium pentoxide. The acetaldehyde formed in the process is swept out from the reactor under a stream of nitrogen. The reaction is continued until the mixture develops a vivid deep blue color characteristic of vanadyl sulfate. It is not necessary to isolate the vanadyl sulfate before using it in the process of the present invention.

The following examples will better illustrate the nature of the present invention; however, the invention is not intended to be limited to these examples. Parts are by weight unless otherwise indicated.

Example I

A. *Preparation of vanadyl sulfate.*—In a 1-liter resin kettle equipped with a stirrer, condenser, thermometer, and a nitrogen inlet tube were placed a solution of distilled water (50 ml.), 96 percent sulfuric acid (35 ml., 64.4 grams, 0.657 mole), and ethyl alcohol (100 ml., 75 grams, 1.63 moles). Technical grade (88–92%) vanadium pentoxide (20 grams, 0.11 mole) was then added and the resulting brown slurry heated, while stirred, under reflux. The acetaldehyde formed in the process was swept out by the strong stream of nitrogen which was passed over the reaction mixture. Reflux began at 65–70° C. The brown slurry became a green solution in about 10 to 15 minutes; after 30 to 40 minutes of heating, a vivid deep blue color, characteristic of vanadyl sulfate, appeared.

B. *Reduction of vanadyl sulfate to vanadic sulfate.*— At this point the reaction temperature had risen to 79° C. After the clear, deep blue, homogeneous solution had been cooled to 25° C., zinc dust (7.19 grams, 0.11 mole) was added. The solution immediately turned green and the temperature of the reaction mixture rose to about 50 to 60° C. The reaction mixture was stirred thereafter for 1 hour and 40 minutes. At this point all the zinc had been consumed.

C. *Formation of vanadium tris(acetylacetonate).*—Acetylacetone (66 grams, 0.66 mole) was added all at once to the vanadic sulfate solution. A deep brown solution of vanadum tris(acetylacetonate) resulted immediately. A 1.6 molar aqueous solution of anhydrous sodium carbonate was then added until the pH of the reaction mixture had risen to a value of 1.5. The brown crystalline vanadium tris(acetylacetonate) which precipitated was collected by filtration, washed with 2 to 3 liters of water, and dried to constant weight. The yield was 55.1 grams (79%).

D. When a procedure was carried out, similar to that of Part C above except that the pH was raised to 2.0, the yield was about 86%.

Example 2

The procedure of Example 1 above was repeated substituting 37% hydrochloric acid (110 milliliters, 130 grams, 1.32 moles HCl) for the 96% sulfuric acid in Part A so as to prepare vanadyl chloride. The final pH was about 1.2. The yield of vanadium tris(acetylacetonate) was 57.9 grams (83%).

As many widely different embodiments of this invention may be made without departing from the spirit and scope thereof, it is to be understood that this invention is not limited to the specific embodiments thereof except as defined in the appended claims.

The embodiments of this invention in which an exclusive property or privilege is claimed are defined as follows.

We claim:

1. A process for the preparation of vanadium tris(acetylacetonate) which comprises contacting an aqueous mineral acid solution of a vanadyl salt of an aqueous mineral acid with zinc metal, the molar ratio of said vanadyl salt to said zinc being about 2:1 and there being at least 2 equivalents of said acid for each mole of said vanadyl salt thereby forming the vanadic salt of said acid, introducing acetylacetone into said solution in an amount to give a molar ratio of acetylacetone to said vanadic salt of at least 3:1 thereby forming said vanadium tris(acetylacetonate); and adding enough inorganic base to raise the pH of the solution to the range of from 0.8 to about 2.0 thereby precipitating said vanadium tris(acetylacetonate) from the solution.

2. A process for the preparation of vanadium tris(acetylacetonate) which comprises contacting an aqueous sulfuric acid solution of vanadyl sulfate with zinc metal, the molar ratio of said vanadyl sulfate to said zinc being about 2:1 and there being at least 2 equivalents of said acid for each mole of said vanadyl sulfate thereby forming the vanadic salt of said acid; introducing acetylacetone into said solution in an amount to give a molar ratio of acetylacetone to said vanadic salt of at least 3:1 thereby forming said vanadium tris(acetylacetonate); and adding enough inorganic base to raise the pH of the solution to the range of from 0.8 to about 2.0 thereby precipitating said vanadium tris(acetylacetonate) from the solution.

3. A process as defined in claim 2 wherein said inorganic base is aqueous sodium carbonate.

4. A process as defined in claim 2 wherein said inorganic base is aqueous sodium hydroxide.

5. A process for the preparation of vanadium tris(acetylacetonate) which comprises contacting an aqueous hydrochloric acid solution of vanadyl chloride with zinc metal, the molar ratio of said vanadyl chloride to said zinc being about 2:1 and there being at least 2 equivalents of said acid for each mole of said vanadyl chloride thereby forming the vanadic salt of said acid; introducing acetylacetone into said solution in an amount to give a molar ratio of acetylacetone to said vanadic salt of at least 3:1 thereby forming said vanadium tris(acetylacetonate); and adding enough inorganic base to raise the pH of the solution to the range of from 0.8 to about 2.0 thereby precipitating said vanadium tris(acetylacetonate) from the solution.

References Cited in the file of this patent

FOREIGN PATENTS 538,453   Italy _____ Jan. 25, 1956

OTHER REFERENCES

Row et al.: "Inorganic Syntheses" 5 (1957), p. 114.